INVENTOR
John L. Pflüeger
BY
Munn, Anderson & Liddy
ATTORNEY

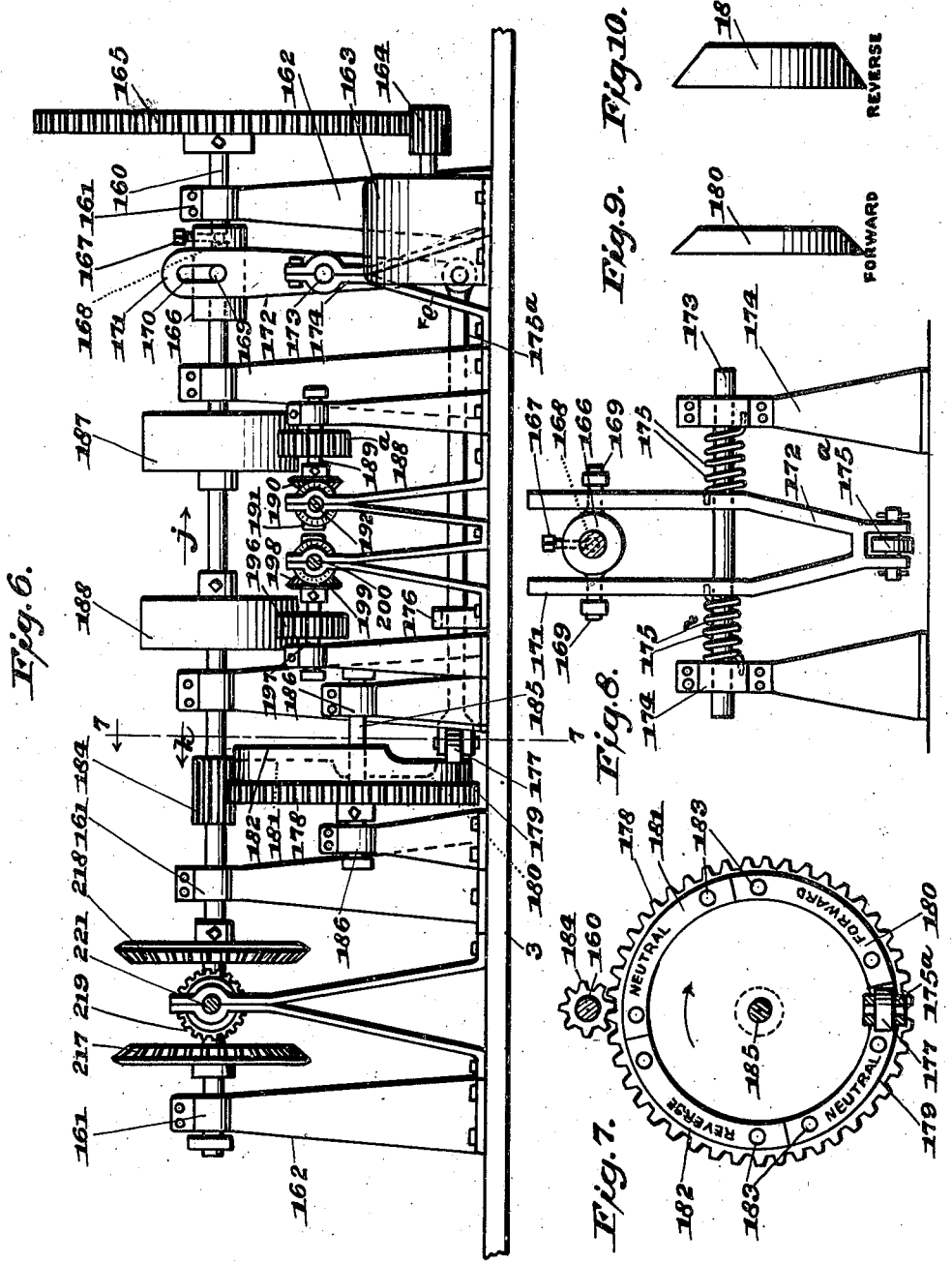

Feb. 11, 1941. J. L. PFLÜEGER 2,231,590
ADVERTISING APPARATUS
Filed Aug. 3, 1939 12 Sheets-Sheet 5
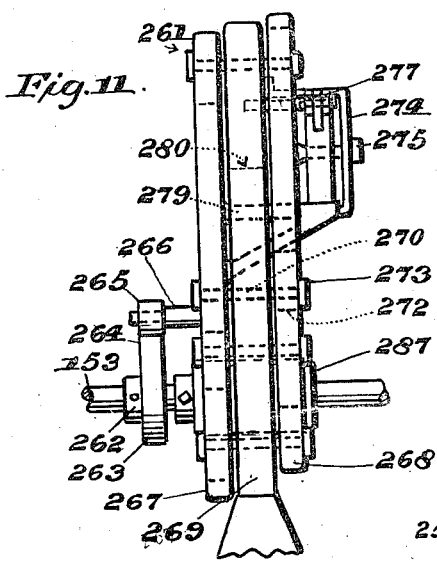
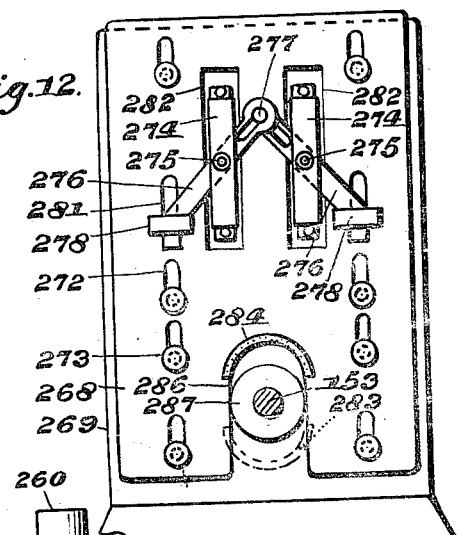
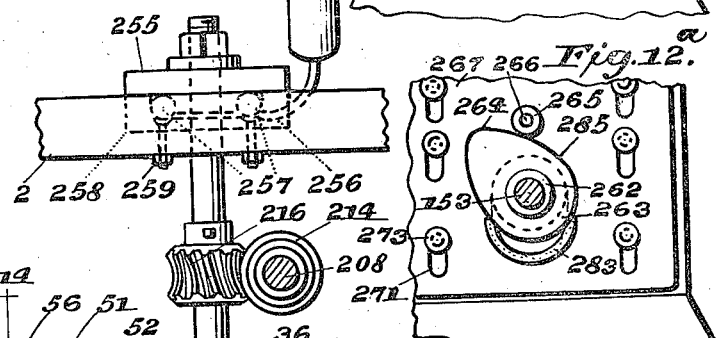
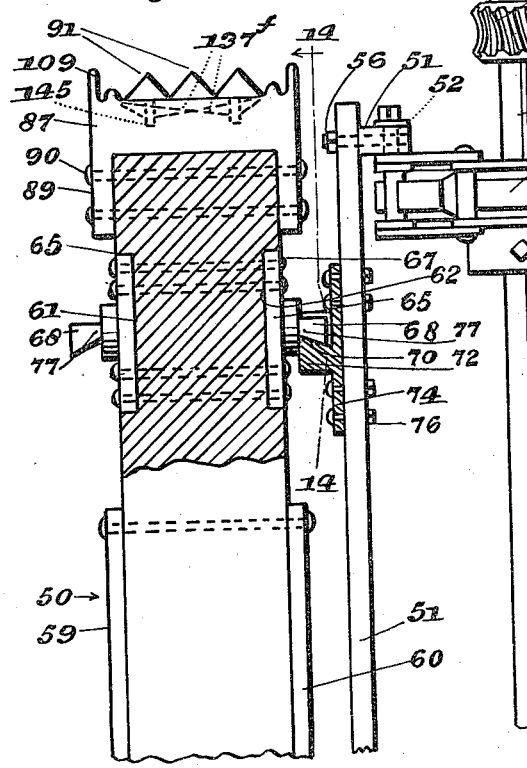
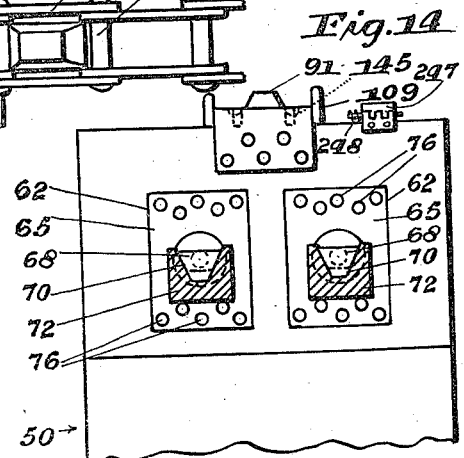
INVENTOR
John L. Pflüeger
BY
Munn, Anderson & Liddy
ATTORNEY

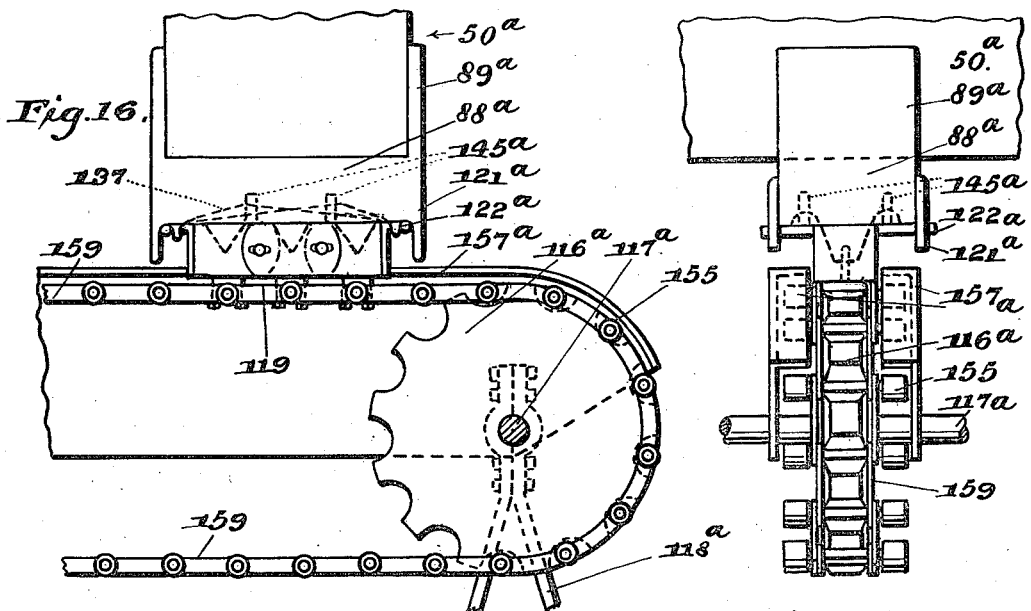

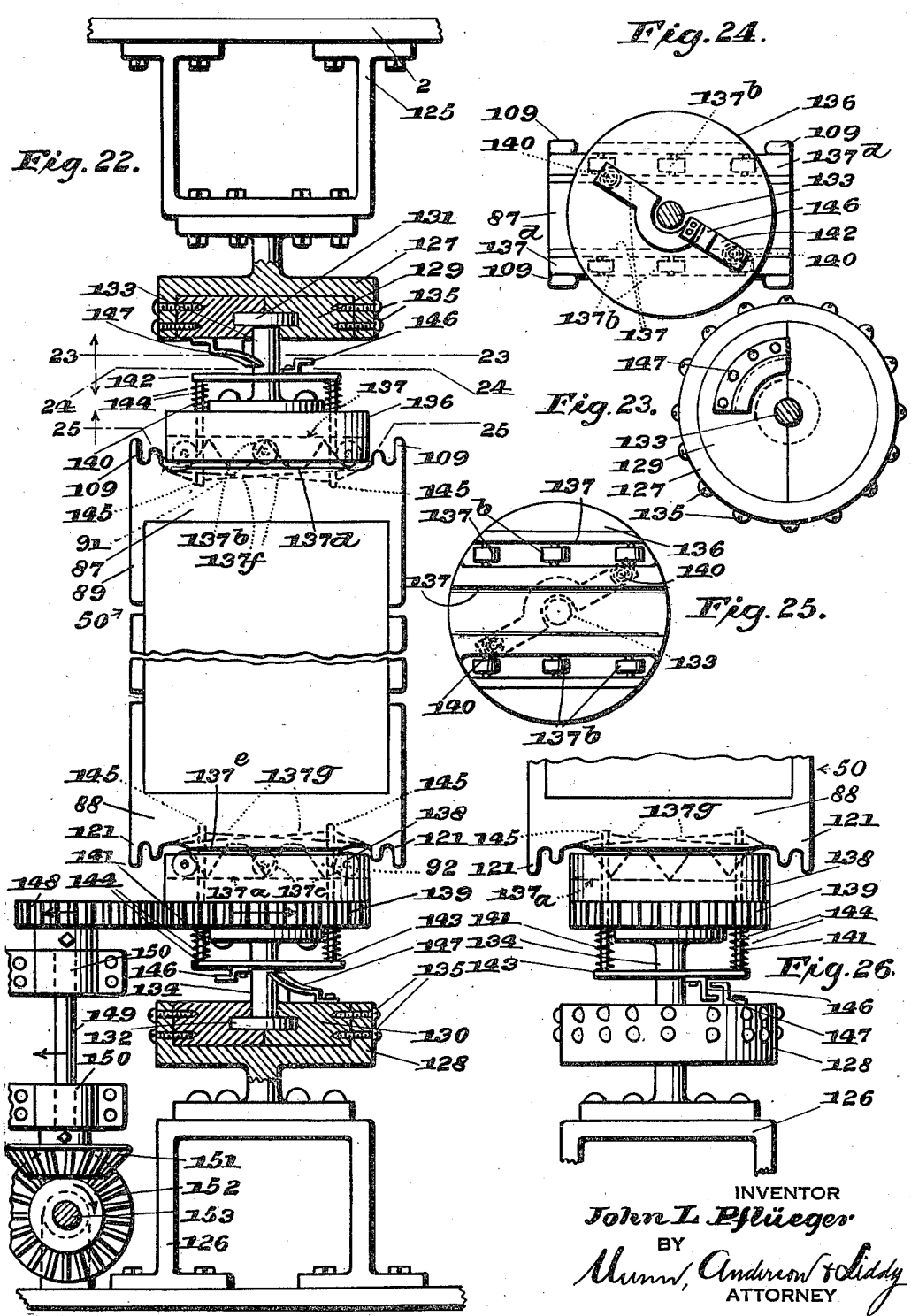

Feb. 11, 1941. J. L. PFLÜEGER 2,231,590
ADVERTISING APPARATUS
Filed Aug. 3, 1939 12 Sheets-Sheet 9
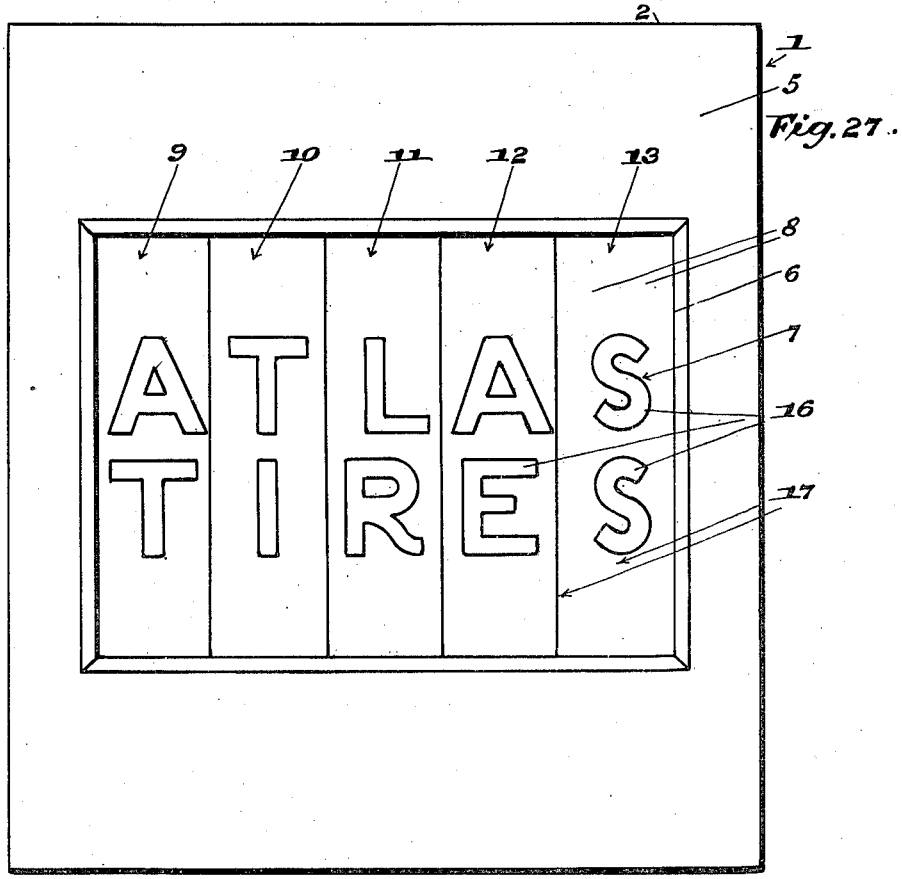
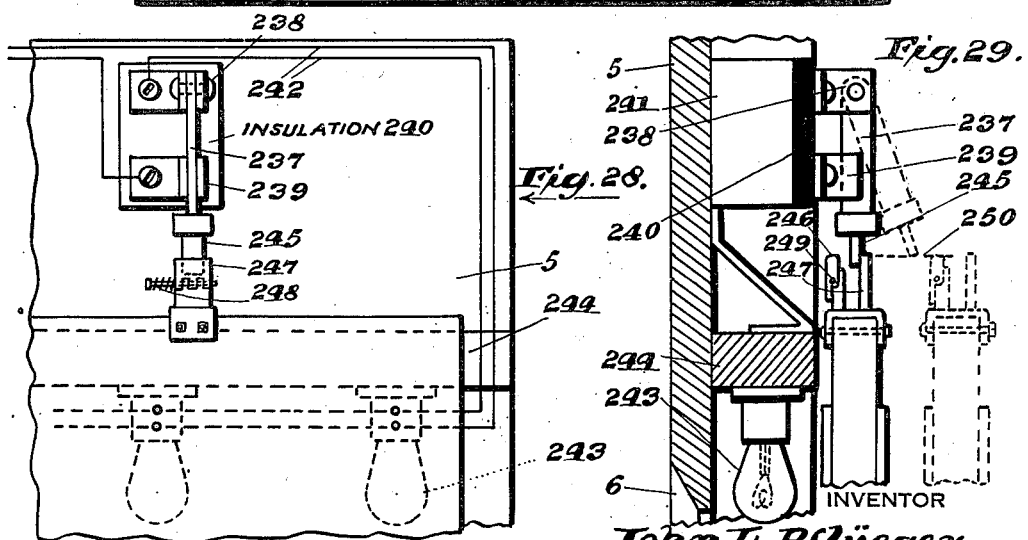

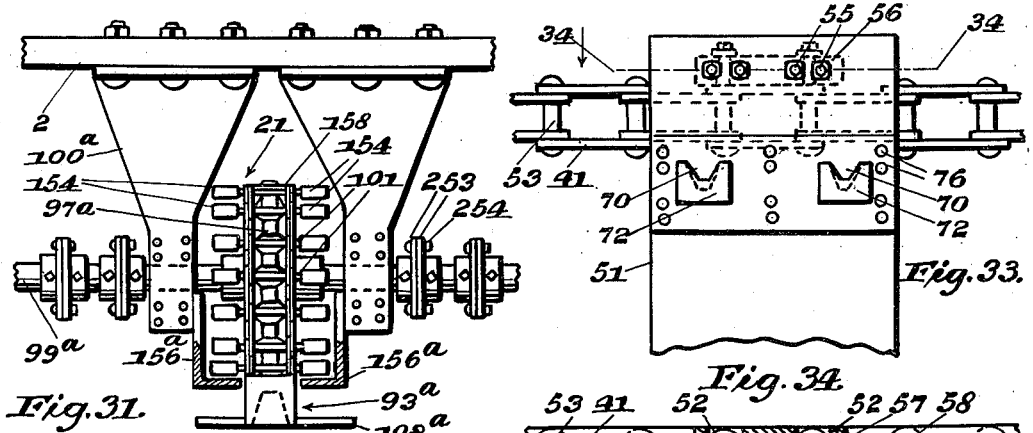
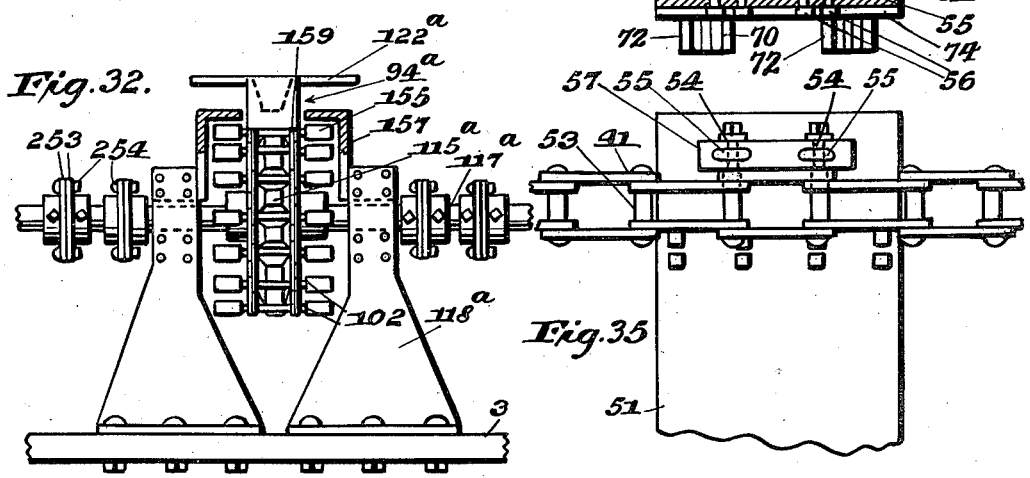
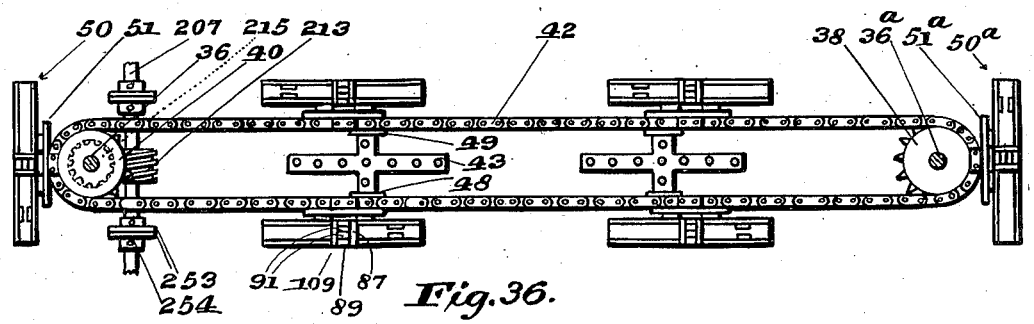

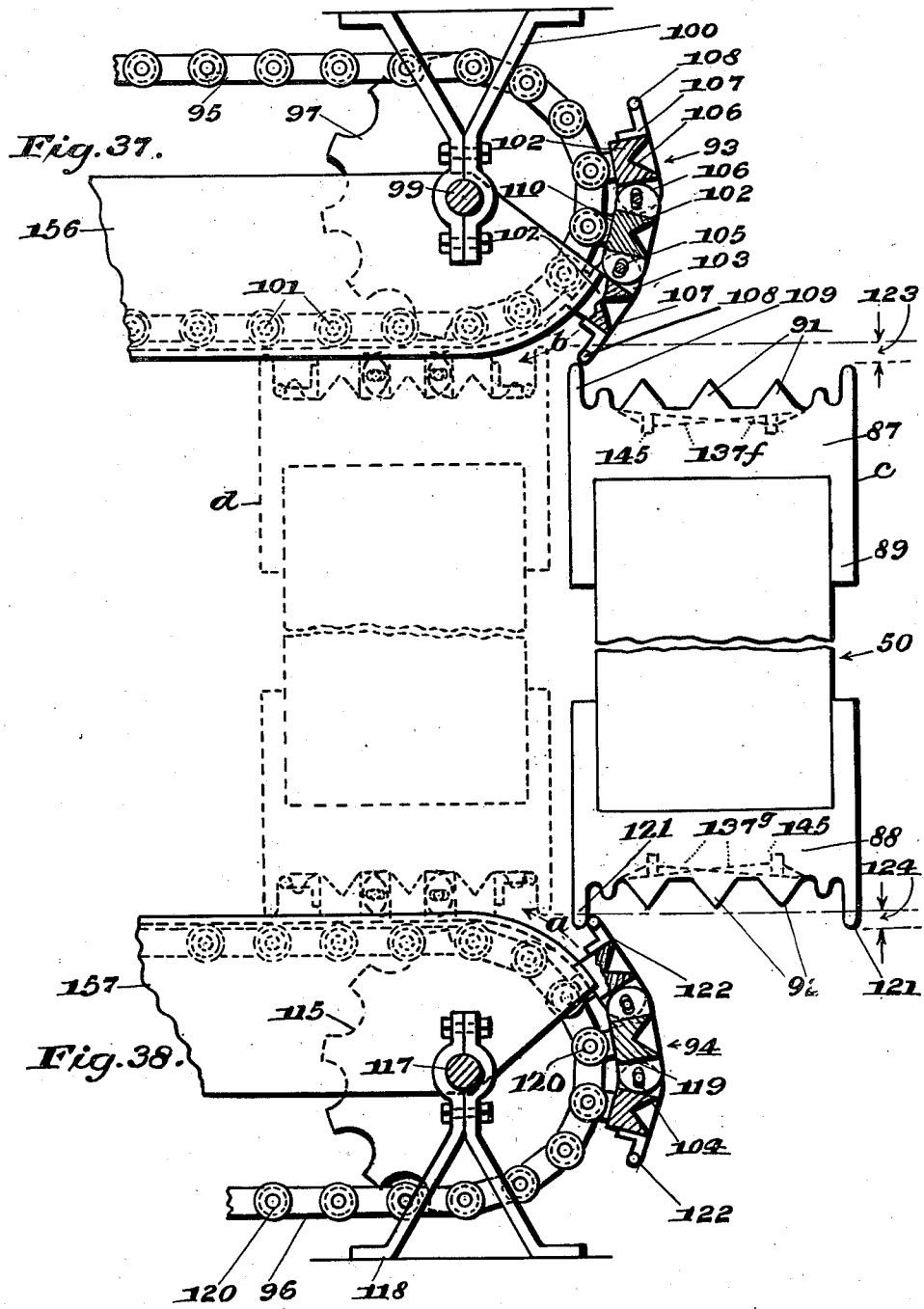

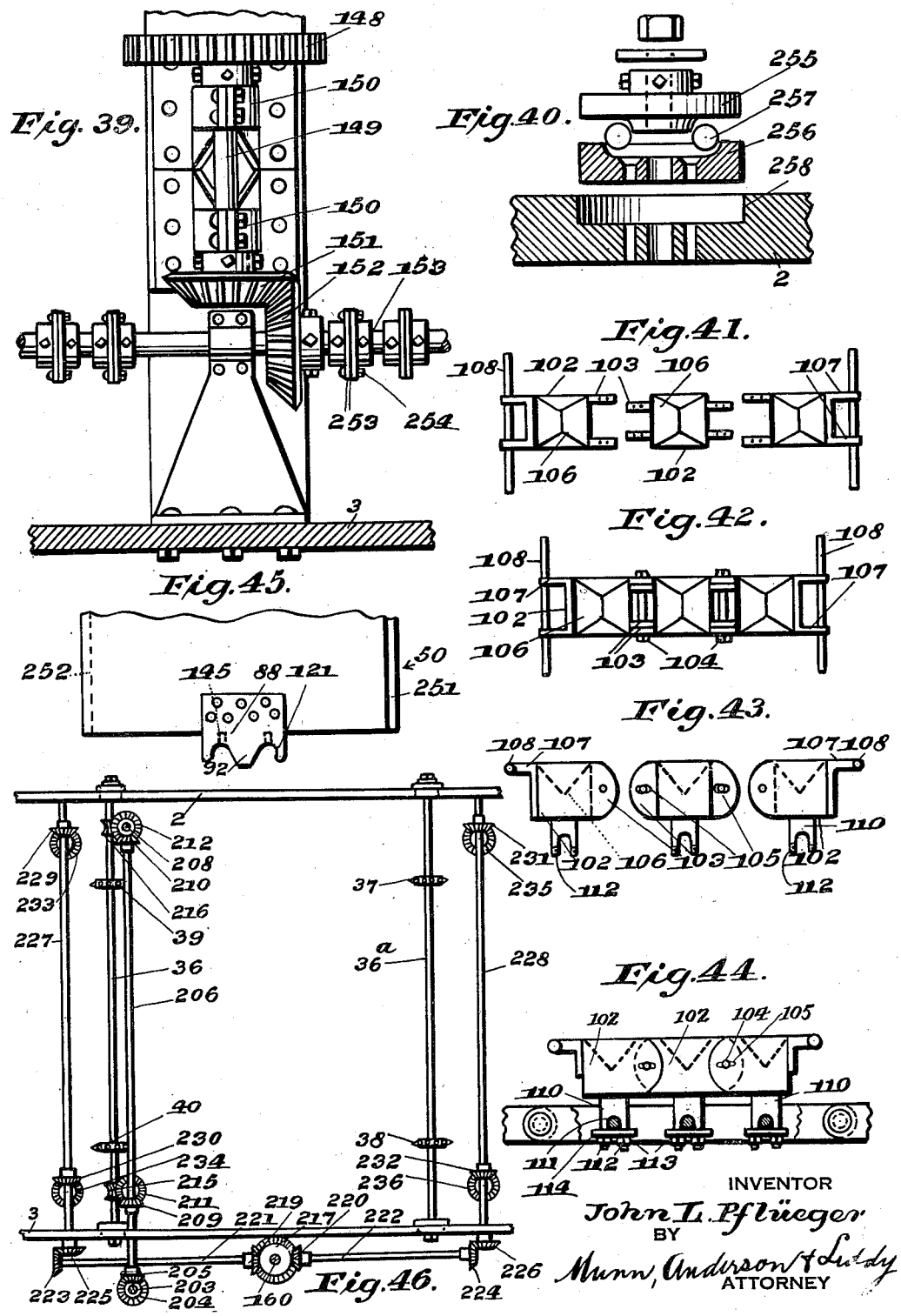

Patented Feb. 11, 1941

2,231,590

UNITED STATES PATENT OFFICE 2,231,590

ADVERTISING APPARATUS

John L. Pflüeger, New Orleans, La.

Application August 3, 1939, Serial No. 288,205

22 Claims. (Cl. 40—32)

This invention relates to improvements in advertising apparatuses, more particularly of the animated type. An advertising device of this kind is much more potent in its effect upon the public than is an advertising device of the stationary type such as a bill-board or the like.

Naturally an animated advertising device is more costly than the stationary type, but as already indicated, the greater cost is more than offset by its advertising value. It is the fundamental purpose of the invention to provide what might aptly be called a semi-automatic advertising apparatus, the characteristic of which is to describe certain prescribed movements for the production of a change in the sign panels whereupon the device becomes quiescent for an appropriate period in order to give observers plenty of time to note and observe the picturization in the frame.

With this preamble in mind the objects of the invention are as follow:

First, to provide an advertising device in which the forcefulness and advertising value of the information sought to be imparted to the public are increased by the interest which the periodic and automatic changing of the signboards will arouse.

Second, to provide an advertising device of the character stated, which is adaptable either to outdoor or show-window use, and capable of manufacture in either large or small sizes to suit the foregoing uses.

Third, to provide an advertising device which has a plurality of signboards, each with fragmental advertising matter thereon, a periodic assemblage of selected groups of boards into successively complete sign panels permitting a wide diversity of matter to be displayed at a cost much less than if the same number of panels were set up on as many individual sites.

Fourth, to provide a sign embodying mechanism by which the signboards are automatically manipulated for an indefinite period to produce and present successively fresh sign panels at the opening of a sign or picture frame, the cycle of changes being limited only by the number of groups of boards contained by the sign housing.

Fifth, to make provision for the easy disassemblage of the mechanism in the event of a fault in its operation, consisting of flange-couplings at numerous intervals along certain shafts, said couplings being positioned between chain-belt divisions and therefore so located as to permit isolating any signboard unit.

Sixth, to provide a sign of the character described which is adaptable to night advertising, lamps being provided to illuminate the sign panels at the completion of a change, and automatically switched off during the period of the change.

Other objects and advantages will appear in the following specification, reference being had to the accompanying drawings, in which:

Figure 6 is a section taken on the line 6—6 of Fig. 3.

Figure 7 is a cross section taken on the line 7—7 of Fig. 6, particularly illustrating the face of the cam gear.

Figure 8 is a cross section taken on the line 8—8 of Fig. 3.

Figure 9 is an end elevation of the forward cam segment of the cam gear in Fig. 7.

Figure 10 is an end elevation of the reverse cam segment of the cam gear.

Figure 11 is a side elevation of a brake arrangement hereinafter described.

Figure 12 is a cross section taken on the line 12—12 of Fig. 11.

Figure 12a is a cross section taken on the line 12a—12a of Fig. 11.

Figure 13 is a detailed sectional view, parts being shown in elevation, particularly illustrating the structural arrangement of the upper end of one of the signboards.

Figure 14 is a vertical section taken on the line 14—14 of Fig. 13, showing a portion of one of said boards, particularly illustrating one of the so-called tooth edges and one of the twin sockets.

Figure 16 is a section taken on the line 16—16 of Fig. 1 illustrating the act of advancing one of the sign members to the exhibiting position in the exhibiting compartment of the sign housing.

Figure 17 is a front elevation of most of the structure illustrated in Fig. 16.

Figure 18 is a plan view of the forward carrier chain and one of its tooth sockets.

Figure 19 is a plan view of the tooth edge of one of the sign-boards.

Figure 20 is a detail side elevation of the top roller bracket for one of the top chain belts.

Figure 21 is a cross section taken on the line 21—21 of Fig. 20.

Figure 22 is a vertical section taken on the line 22—22 of Fig. 1, illustrating one of the reversing mechanisms.

Figure 23 is a cross section taken on the line 23—23 of Fig. 22.

Figure 24 is a cross section taken on the line 24—24 of Fig. 22.

Figure 25 is a view of a portion of the mechanism in Fig. 22, as seen on a plane designated by the line 25—25.

Figure 26 is a detail side elevation of a portion of the structure in Fig. 22.

Figure 27 is a front elevation of the sign housing particularly showing the display opening and a series of signboards displayed therein.

Figure 28 is a front elevation of a switch hereinafter described.

Figure 29 is a side elevation of said switch.

Figure 30 is a detail side elevation of one of the shafts, particularly illustrating the couplings.

Figure 31 is a cross section taken on the line 31—31 of Fig. 2 and illustrating one of the top signboard guides.

Figure 32 is a similar view illustrating one of the bottom signboard guides.

Figure 33 is a partial side elevation of one of the signboards, particularly illustrating the top end and showing its connection to the respective chain belt.

Figure 34 is a cross section taken on the line 34—34 of Fig. 33.

Figure 35 is a rear elevation of the structure shown in Fig. 33.

Figure 36 is a plan view of one of the signboard chain belt units.

Figure 37 is a side elevation of the bottom signboard guide in the reversing unit, illustrating how a signboard is coupled on.

Figure 38 is a similar view of the matching top signboard guide.

Figure 39 is a vertical section taken on the line 39—39 of Fig. 2.

Figure 40 is an expanded partially sectional and elevational view of one of the bearings.

Figure 41 is a plan view of one of the tooth edge sockets in disassembled form.

Figure 42 is a plan view of the same socket showing the parts in assemblage.

Figure 43 is a side view of the tooth edge socket showing the parts in disassembled form.

Figure 44 is a side elevation of the assembled tooth edge socket.

Figure 45 is a side elevation of the lower end of one of the signboards.

Figure 46 is a side elevation of a portion of the shafting hereinafter referred to.

Figure 2:
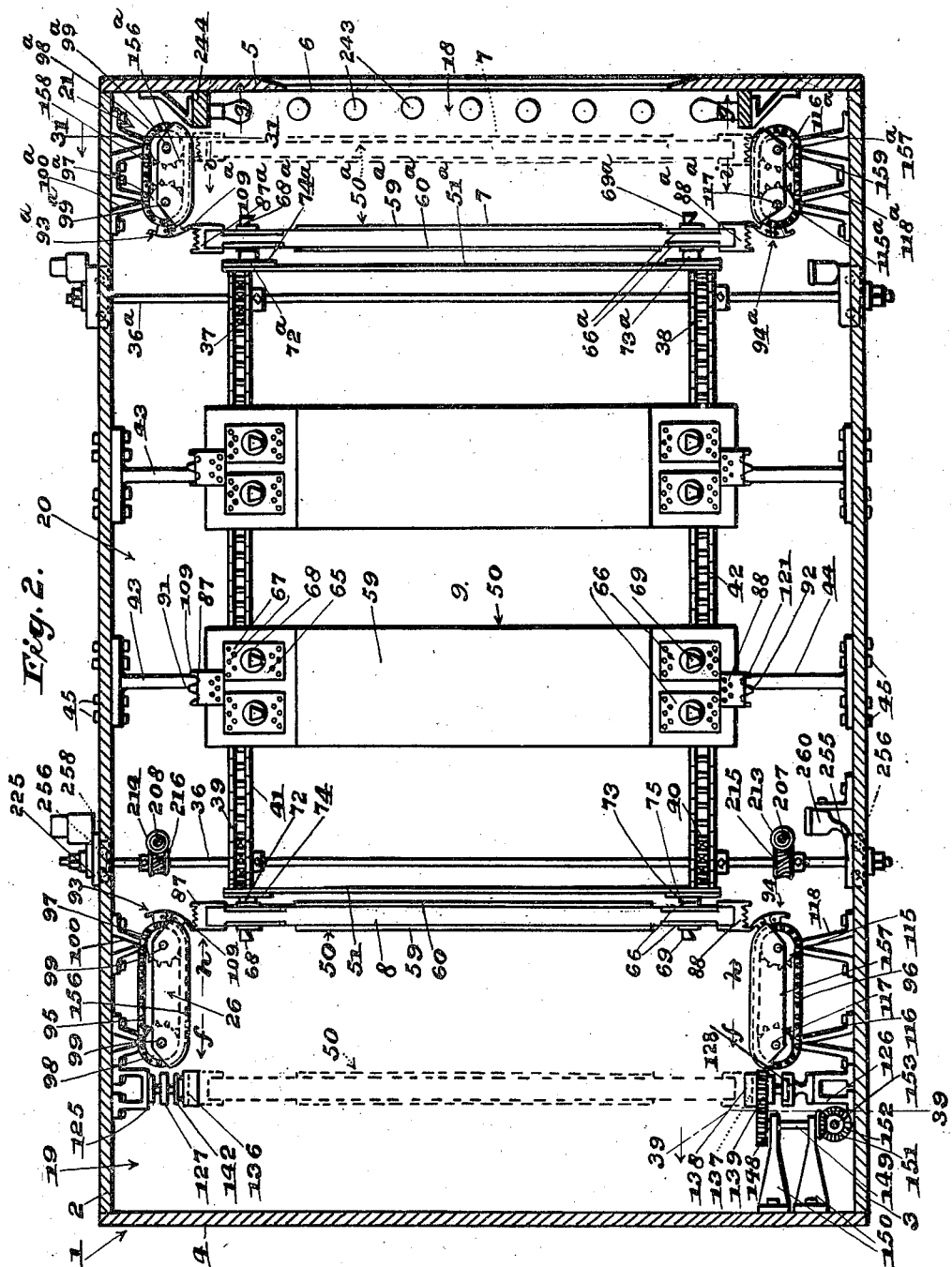
Figure 2 is a vertical section taken on the line 2—2 of Fig. 1.

In carrying out the invention provision is made of a housing generally designated 1 (Figs. 2 and 27). This housing is usually rectangular in form, although this statement of preference is not to be regarded as a limitation because the housing is adapted to be made in any shape desired. In any event the housing will comprise a top 2 (Fig. 2), bottom 3, back 4, and front 5. The latter is hereinafter known as the sign or picture frame.

The picture frame 5 has an opening 6 (Figs. 2 and 27) in which the sign 7 is displayed. Said sign, as illustrated in Fig. 27, is composed of a plurality of signboards 8. These signboards are each individual members of groups herein known as signboard units. The instant disclosure is limited to five signboard units, successively designated 9, 10, 11, 12 and 13 (Fig. 1), but here it must be understood that there is virtually no limit to the number of such units in a given sign housing, the actual number of such units being determined by the size of the sign and the character of the goods intended to be advertised.

Figure 1:
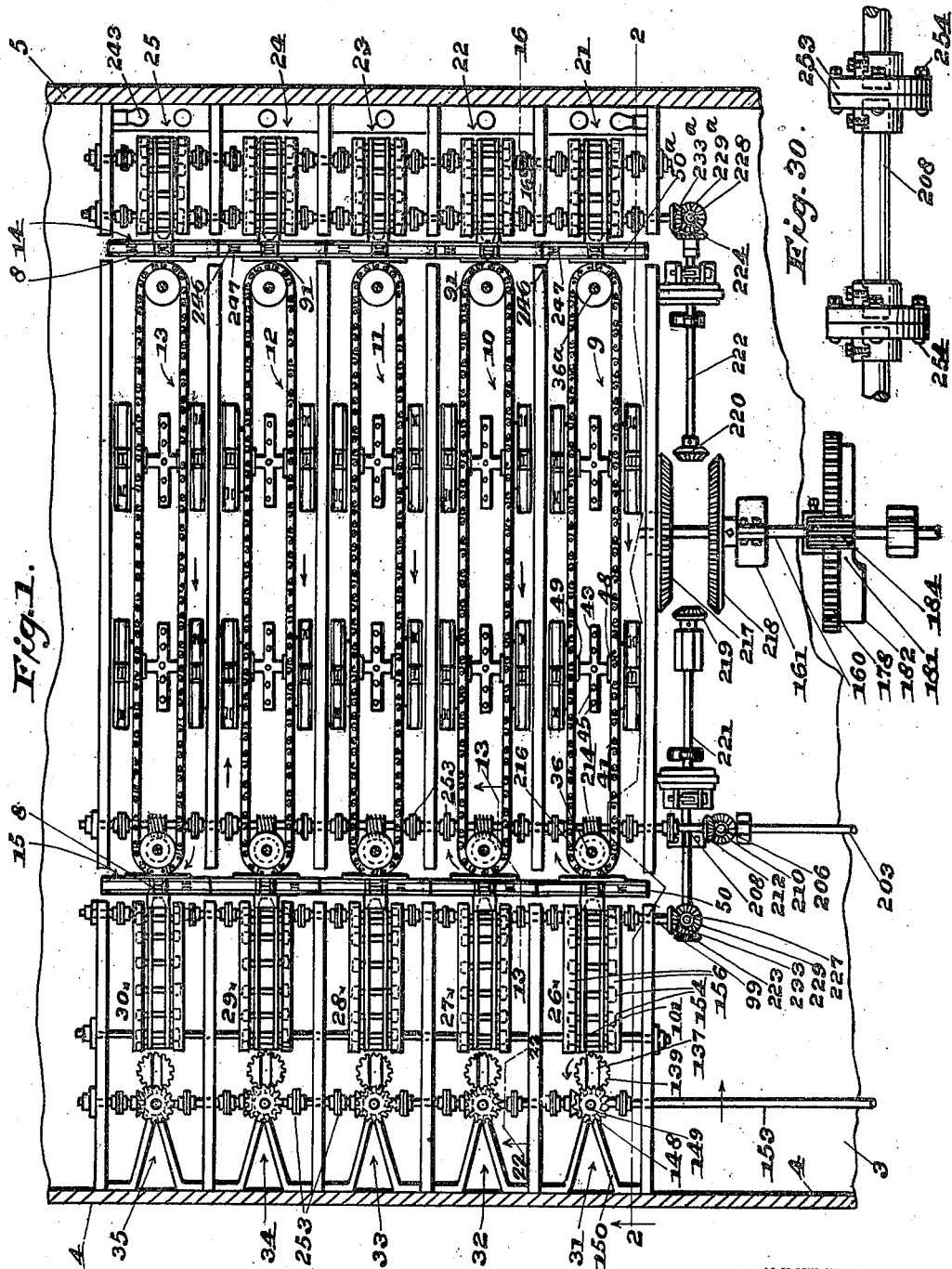
Figure 1 is a fractional plan view of the invention which is hereinafter known as the multi-advertisement device, portions of the housing being shown in section.

Reference is made to Fig. 1 which well illustrates how the signboards 8 are assembled in panel formation both adjacent to the picture frame 5 and adjacent to the back 4. The first panel formation is designated 14, the second being designated 15. Each of the signboards 8 carries a fraction of a sign or some other picturization. Such a fraction is illustrated, for example, at 16 in Fig. 27. The manner of making the panel 14 and of making all of the other panels is to assemble the signboards in the panel formation and then either to paint or paste the sign thereon. Clean cuts are then made along the division lines 17 (Fig. 27) and thereafter the signboards which constitute the respective panel are subject to separation and ultimate reassemblage successively at the front and back of the sign housing.

It is the underlying purpose of the invention to provide mechanisms for automatically assembling and disassembling the signboards. But before describing one of the units 9, 10, etc. which accomplishes this function, note is also made of the fact that the housing 1 is well defined by the distribution of the mechanisms into an exhibiting compartment 18 (Fig. 2), a reversing compartment 19 and a medially situated forwarding compartment 20. These mechanisms include five forward carriers 21, 22, 23, 24 and 25 (Fig. 1) and five rearward carriers 26, 27, 28, 29 and 30. The rearward carriers are supplemented with reversing devices 31, 32, 33, 34 and 35.

The foregoing contrivances are arranged in a serial order in the housing 1 (Fig. 1), and each series is hereinafter designated a sign mechanism. For example, the first mechanism reading upward from the bottom of the sheet (Fig. 1) comprises the forward carrier 21, the signboard unit 9, the rearward carrier 26 and the reversing device 31. All of these mechanisms are coordinated in their operation, but inasmuch as all of the sign mechanisms are identical in structure and operation, the description of the first sign mechanism is here given as sufficient for the others.

The signboard unit 9 (Fig. 2) has a pair of upright shafts 36, 36a. These shafts are parallel to each other and each one carries pairs of sprockets 37, 38 and 39, 40. These sprockets are in horizontal alinement so that they become pairs 37, 39 and 38, 40 for the purpose of carrying upper and lower chain belts 41, 42. The chain belts must be supported medially of the horizontal pairs of sprockets to prevent undesired sagging, it being seen in each of Figs. 1 and 2 that there is a considerable distance between the shafts 36, 36a.

Brackets 43, 44, depend from the top 2 and are upstanding from the bottom 3. One of the brackets 43 is illustrated in Figs. 20 and 21, it being understood that the structure of the brackets 44 is identical. The bracket 43 is secured at 45 to the top 2. It has a plurality of webs 46 which support the shaft 47 of a pair of deeply grooved rollers 48, 49. The deep grooving provides an adequate rest for the two flights of the respective chain belt.

These belts comprise the mounts for a series of plates (Figs. 1 and 2). The plates are secured to the chain belts in order to dispose each of the signboards vertically in the forwarding compartment, it being understood from this statement that the belt is the foundation of a signboard in every instance. As seen in Fig. 1 each of the signboard units comprises a series of six signboards. This number, however, may be increased or diminished in accordance with the requirements of the sign. Since each of the signboards is alike in construction, the description of one will suffice for all.

The signboard adopted for description is designated 50. This signboard and all others in the second panel formation 15 (Fig. 1) are in confronting relationship to the reversing compartment 19. The matching signboard 50a, so identified because of its being at the entrance to the exhibiting compartment 18, is situated at one end of the panel formation 14, which is in confronting relationship to said compartment. The previously mentioned plate now designated 51 is secured at its upper and lower ends to the chains 41, 42, as already pointed out. A properly located pair of link pins 52 (Fig. 34) is used for making the connection. The pair illustrated occurs in the upper chain belt 41, and an identical pair will be selected from the lower chain belt 42.

These link pins are made differently from the other link pins 53 of the chain, in that they have spindle extensions 54 which elevate the point of connection of the plate 51 to a place outside of the sprocket tooth spaces. This is necessary so as not to interfere with the passage of the chains around the sprockets.

U-bolts 55 (Figs. 33 and 35) are used to anchor the pins 52 to the plate 51. These U-bolts are secured by nuts 56 which appear on the front of the plate. A spacer 57 is interposed between the pins 52 and the plate 51, said spacer being thick enough to define a space 58 between the chain and plate of a width sufficient for the occupancy of the flanges of the rollers 48, 49, (Figs. 21 and 36).

Figure 15:
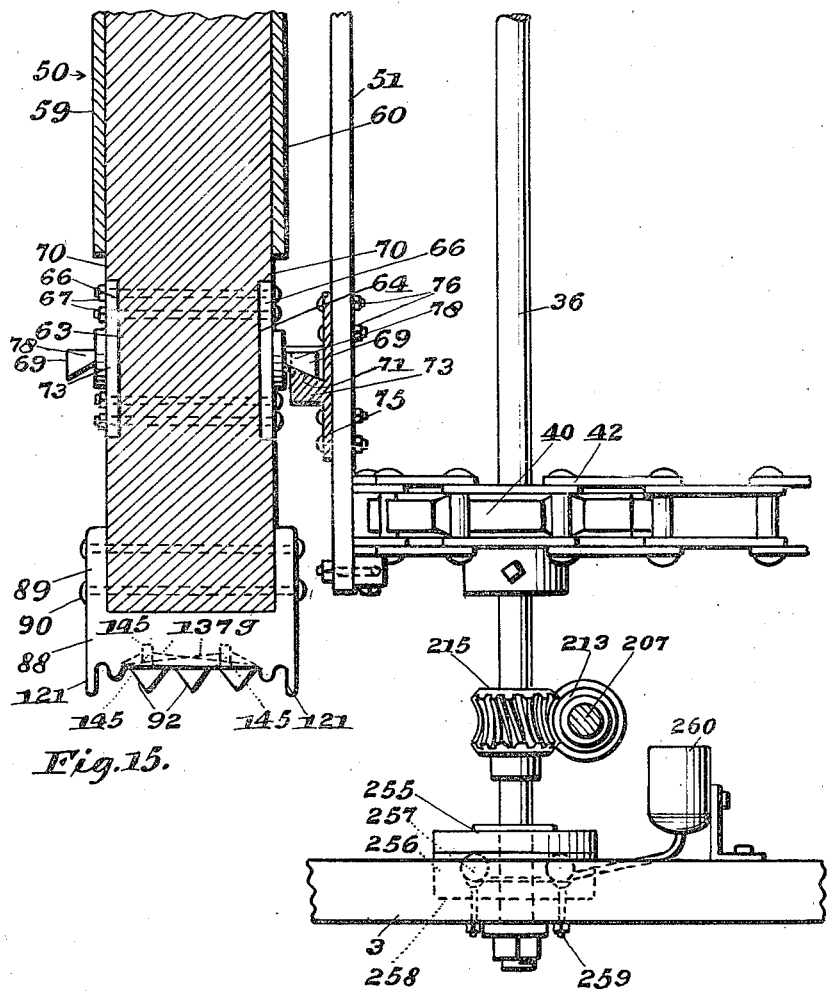
Figure 15 is a partly sectional and elevational view to be read in continuation of Fig. 13, illustrating the structural arrangement at the lower end of the signboard.

The signboard 50 (Fig. 2) of which the upper and lower structural arrangements are detailed in Figs. 13 and 15, may consist of a wood board or it may comprise a metal panel. A wood board is herein adopted for illustration and it is sufficiently reinforced to prevent warping in the event of its becoming wet. In actual practice the reinforcement will include a marginal metallic framing. This is not shown in the drawings, but each of Figs. 13 and 15 illustrates an attached metal surface plate 59, 60 to the front and back. These terms are interchangeable because after a reversal of the signboard the plate 60 will be on front and the plate 59 on back.

Recesses 61, 62, are cut into the board 50 at the top (Fig. 13) and similar recesses 63, 64 are cut into the board at the bottom (Fig. 15). These recesses contain pairs of plates 65 and 66, respectively at the top and bottom, secured together at 67 through the board. The respective ones of the two pairs of plates carry integral hooks 68, 69. The heads of these hooks are of substantially triangular shape when viewed from the front (Figs. 2 and 14) to match the sockets 70, 71 in receptors 72, 73 standing out from plates 74, 75 which are secured to the sign supporting plate 51 as at 76. Said hook heads taper away from their triangular fronts until they define reduced necks at 77, 78, which are properly matched by the slot shapes of the sockets 70, 71 (Fig. 14).

The substantially triangular configurations of the hooks and sockets serve a number of important purposes; first, a firm connection is made when the hooks settle in the sockets under the weight of the signboard 50, second, the signboard cannot possibly pull away laterally from the carrier plate 51, third, the hooks are released from the sockets as easily as they are set therein, and only a slight lift is required to effect a full release prior to the lateral displacement of the signboard.

It will be understood from the foregoing that the hooks 68, 69 provide hangers for the signboard 50. Each signboard is adapted to be hung upon its set of hooks during transmission forwardly and backwardly of the forwarding compartment 29. The signboards 50, 50a (Fig. 1) are adapted to be lifted or unhooked simultaneously and in the same way advanced toward the front and back of the housing. This advancement of the signboard 50 to its dotted line position in Fig. 2 leads to its reversal, while the advancement of the signboard 50a to its dotted line position in Fig. 2 leads to its display position in the opening 6 of the sign frame 5.

Lifting of the signboard is accomplished in the following manner, the structure involved now being described in detail. Said description is applied to the rear signboard 50 (Fig. 2) and its correlated parts, but it is to be understood that the identical description also applies to the front signboard 50a, the identical numerals being distinguished by the exponent letter a. Tooth edge connections 87, 88 (Figs. 13 and 15) are affixed to the top and bottom of the board 50. Any desired mode of affixation may be employed, the preferred structure involving the flanges 89 through which securing pins 90 are driven, as shown.

Said connections 87, 88 include series of teeth 91, 92. These are desirably pyramidal in shape, as shown in Figs. 13, 15, 37 and 38. This particular form makes for ease of connection and disconnection with the companion tooth edge sockets 93, 94 of the carriers 26, 21 (Figs. 1 and 2).

These particular carriers, commonly designated 26 etc. and 21 etc. (Fig. 1) actually comprise short duplicate carrier chains, the upper ones of which are designated 95 and the lower ones 96 (Figs. 37, 38). The upper carrier chain 95 is applied to a pair of sprockets 97, 98 (Fig. 2) mounted on shafts 99 which in turn are supported by brackets 100. The links of the chain 95 are connected by pins 101, certain ones of which are used as mounts for the respective socket 93. Said socket comprises a series of socket members 102 (Fig. 41) provided with ears 103 which are interconnected by pins 104 (Fig. 42). The connection is required to be loose, and for that purpose said pins occupy slots 105 in the ears (Fig. 43).

Each of the socket members is recessed at 106. The shape of each recess is that of an inverted pyramid to match the pyramidal teeth 91 of the connection 87 (Fig. 13). Brackets 107 of any suitable formation provide the mounts for anchor pins 108 which extend crosswise of the chain 95. These pins are adapted to engage with anchors 109 on the connection 87. These anchors are hook-shaped and the anchor pins are adapted to rest in the bends of the hooks (Fig. 37).

The socket members 102 (Fig. 41) are each equipped with lugs 110 (Fig. 44) preferably supplied in pairs. These lugs are on the outsides of the socket members so that when connection is made with selected ones of the pins 101, the center tooth spaces of the chain will not be obstructed. Each lug 110 is arched at 111 (Fig. 44) to seat upon the respective pin 101. The small studs 112 resulting from the arching are threaded to receive nuts 113 which are screwed up against a bridge plate 114 that is emplaced on the studs against the pin 101. The connection here is intended to be tight, but the radial positions which the members 102 maintain in rounding the sprocket 97 (Fig. 37) are compensated for by the loose connections 104, 105.

An identical structure is adopted at the lower carrier chain 96. This chain is carried by sprockets 115, 116 (Fig. 2) mounted on shafts 117 in turn carried by brackets 118. The socket members 119 of the socket 94 (Fig. 38) are attached to selected pins 120 of the chain 96 in the identical manner of the socket members 102, the former being similarly recessed and loosely coupled as can be seen in Fig. 38, without further explanation.

On the same principle the tooth edge connection 88 (Figs. 15 and 38) is provided with anchors 121 to supplement the teeth 92 and to make engagement with the anchor pins 122 of the socket 94.

Attention is directed to Figs. 37 and 38 for a structural detail which explains the lifting of the signboard 50. When the latter occupies its position in the panel formation 15 (Fig. 1) it stands as shown in full lines in Figs. 2, 37 and 38. The tooth series 91, 92 then assume a relationship to the confronting top and bottom flights of the chains 95, 96 substantially as shown. It will be seen from this showing that a lift of the signboard is required. This, however, is desirably small only being equal to the amounts designated at 123, 124 (Figs. 37, 38). Lifting of the board 50 is accomplished by the engagement of an anchor pin 122 with one of the anchors 121, both chains 96, 95 having started to travel in the directions of arrows a, b.

The lifting of the signboard 50 begins from its full-line position c (Figs. 37, 38) which comprises its static state up to the moment of lifting. By a continuation of the turning of the sprockets 97, 115, the signboard soon reaches the dotted line position d (Figs. 37, 38) in readiness to travel rearwardly in the reversing compartment 19. The previously mentioned amounts of lift 123, 124 are traversed between the full and dotted line positions of the signboard, and it is this lifting of the signboard which disengages the latter from the twin hooks 68, 69 (Figs. 13 and 15). It is repeated that the structures and mode of operation occurring in the immediately preceding description also apply to the front signboard 50a.

The manner in which the signboard 50, and all other signboards in the panel series 15 (Fig. 1) is reversed in the compartment 19 is as follows: Brackets 125, 126 respectively secured to the top 2 and bottom 3 of the housing 1 provide the supports for journal members 127, 128 (Fig. 22). These journal members have segmental fillers 129, 130, which are made in order to enable connection with the heads 131, 132 of axially alined shafts 133, 134. The fillers are secured in the respective journal members by screws 135 or suitable equivalents.

The shaft 133 is secured to a block 136 which has cross slots 137 (Fig. 25). A similar block is similarly slotted at 137a (Fig. 26). These slots make room for the teeth 91, 92 (Figs. 37, 38), the necessity of which is readily apparent. Said block 138 is carried by the shaft 134, but said block actually surmounts a gear 139 in physical connection with the shaft 134. Said blocks have other but smaller slots, the walls of which support rollers 137b, 137c. The rollers ease the entry and departure of the signboard 50. To this end the connections 87, 88 have tracks 137d, 137e (Fig. 22) on which the rollers run.

Pairs of pins 140, 141 are slidably carried by the respective blocks 136, 138, but in respect to the latter the pins 141 also slidably pass the gear 139. These pairs of pins are bridged at 142, 143 at their remote ends, said bridges also supplying the abutments for the far ends of springs 144. The inner ends of these springs respectively engage the block 136 and the gear 139, and they tend to press said pairs of pins outwardly and away from the signboard 50 when emplaced as shown in Fig. 22.

The tooth edge connections 87, 88 of said signboard are socketed at 145 to receive the points of said pairs of pins when the latter are forced inwardly. The connections 87, 88 have grooves 137f, 137g, leading into the sockets, thus guiding the pins 140, 141. This act is accomplished by the riding of arms 146 (Fig. 22) down the previously engaged cams 147. The arms 146 are secured to the bridges 142, 143. The cams 147 are secured to selected ones of the fillers 129, 130. Said arms are in engagement with the cams, having ridden to the remote parts thereof at the time of the reception of the signboard 50.

This is necessary to permit the assumption of the dotted line position by the signboard 50 (Fig. 2), the pairs of pins 140, 141 then being retracted within the blocks 136, 138. The tooth series 91, 92 of the signboard are then free to occupy the slots in the blocks 136, 138, the subsequent turning of the gear 139 disengaging the arms 146 from the cams 147.

As said arms ride down the cams to the inner points of the latter the springs 144 are permitted to extend the pairs of pins into engagement with the sockets 145. The turning of the gear 139 continues for 180 degrees. This comprises the reversal of the signboard so that the fraction of the sign which previously faced right from the series 15 in Fig. 1 now faces left. In other words, the signboard is turned inside out in a manner of speaking.

The foregoing turning of the gear 139 is done by a meshing gear 148 (Fig. 22). This gear is carried by a shaft 149. Said shaft is supported in the upright position by bearings 150 (Fig. 39) in which it is mounted. The lower end of the shaft carries a bevel pinion 151 which is in mesh with a drive pinion 152 on a counter-shaft 153. The latter is turned periodically in the same direction, the duration of turning being sufficient to produce the foregoing 180 degrees reversal of the signboard 50.

When the latter is reversed in the manner pointed out it is abstracted from the reversing device 31 (Fig. 1) and then carried forwardly (Fig. 2) to the full line position where it reassumes its station in the panel series 15. The manner of the foregoing abstraction is identical with the previously described manner of coupling the signboard with the upper and lower carrier chains 95, 96 (Figs. 37, 38). The previously unengaged anchor pins 108, 122 are now coupled with the previously unoccupied anchors 109, 121. The chains 95, 96 having temporarily stopped during the period of reversal of the signboard 50, are again started, but reversely to the previous direction, thereby abstracting the signboard from the reversing device 31 and forwarding it to the panel series 15, as previously described in reference to Fig. 1.

Reverting to the structure of the chains 95, 96 (Figs. 37, 38) it will be observed in Figs. 31 and 32 that alternate ones of the link pins 101, 120 project far enough beyond the sides of the respective chain to provide supports for rollers 154, 155. These rollers are adapted to ride on tracks 156, 157. These tracks are supported in fixed relationship to the contiguous ones of the flights of the chains 95, 96. Their purpose is to keep said flights perfectly straight, thereby to avoid sagging. If sagging were permitted then the proper registration of the ends of the signboard with the socket blocks 136, 138 (Fig. 22) would, obviously, be interfered with.

Attention is now directed to the exhibiting compartment 18 (Fig. 2). The forwarding carrier 21 (Fig. 1) is identical to the rearward carrier 26. To this end the forward carrier comprises upper and lower carrier chains 158, 159. The tooth edge sockets 93a, 94a, which these chains carry are identical in structure and function to the sockets 93, 94 (Figs. 37, 38).

The point sought to be made at this stage in the description is that the signboard 50a is merely advanced to the dotted line position (Fig. 2) where it is held stationary for a determined period by the stopping of the chains 158, 159 and is then carried back to the full line position by a restarting of the chains without the occurrence of the previously described reversal. In other words, the advancement of the signboard series 14 to the exhibiting position behind the opening 6 is for the sole purpose of revealing the sign to the public. The panel formation 14 is then backed away whereupon the individual signboards are distributed amongst the units 9, etc., for treatment in the manner already expounded.

The driving mechanism by which the motions of the units 9 etc. forward carriers 21 etc., rearward carriers 26, etc. and the reversing devices 31, etc. are derived, comprises the following structure:

A main drive shaft 160 (Figs. 3 and 6) is revolubly and lengthwise slidably supported in bearings 161 which are carried by standards 162, secured in upstanding positions on an extension of the bottom 3. An electric motor 163 mounted on the latter has a driving pinion 164 in constant mesh with the driven gear 165 on the shaft 160. The pinion 164 is sufficiently longer than the gear 165 is thick to maintain a constant driving connection even though the drive shaft 160 is shifted, as is one of its functions to be.

A sleeve 166 is swivelled on the shaft 160 by means of the engagement of the point of a screw 167 or its equivalent driven through the sleeve, with an annular groove 168 in the shaft. Trunnions 169 on the sides of the sleeve occupy slots 170 in the forks 171 (Fig. 8) of a shifter 172. This shifter is secured to a shaft 173, the ends of which are journaled in fixed bearings 174. Springs 175 are so anchored at their ends as to tend to turn the shifter clockwise (arrow e, Fig. 6).

The shifter has one end of a rod 175 pivoted to it at its lower end (Fig. 6). Said rod is loosely supported in a guide 176 adjacent to its other end, the latter carrying a roller 177 which is constantly urged toward a cam gear 178 by the springs 175. That face of this gear adjacent to the roller 177 carries quarter-section cams 179, 180, 181 and 182 (Fig. 7) which comprise neutral, forward, neutral and reverse cams in the numerical order.

The forward cam 180 is lowest and the reverse cam 182 is highest (Fig. 6). The neutral cams 179, 181 are at an intermediate and mutually common level (Fig. 6). These cams are affixed to the face of the gear 178 by screws 183 to comprise a cam circle, and the roller 177 rides this circle as the gear 178 is revolved continuously by an elongated drive pinion 184 secured on the main shaft 160.

A shaft 185 carries the cam gear 178. This shaft is supported by bearings 186. The cam gear is stationary relatively to the axial movement of the drive shaft 160 and said factors are compensated for by the previously mentioned elongation of the drive pinion 184.

A pair of quarter gears 187, 188 (Fig. 3) is secured to the drive shaft 160. These are identical, mutilated gears (Figs. 4 and 5) and the teeth occupy only one quarter of the periphery or substantially so. They are set 180° apart on the shaft 160, and according to the adopted neutral position of the driving mechanism (Fig. 3) the quarter gear 187 will be the first of the two quarter gears to act. This gear is adapted to actuate the signboard reversing devices 31—35 (Fig. 1). The gear 188 is adapted to actuate the signboard units 9—13 (Fig. 1).

Figure 3:
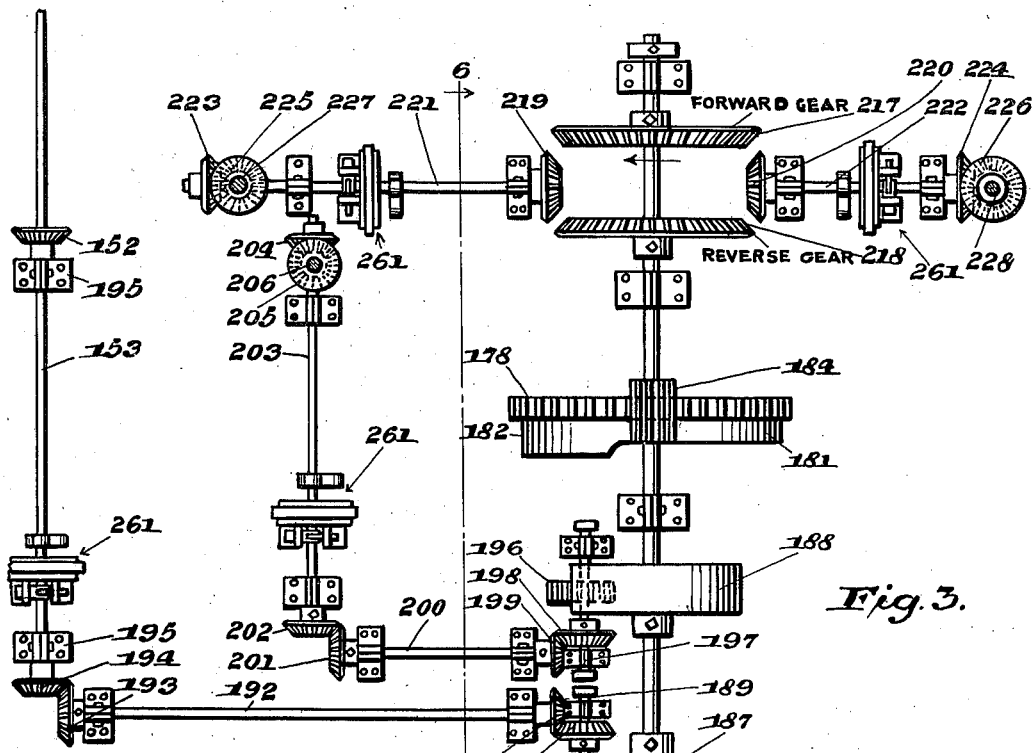
Figure 3 is a plan view of the main and auxiliary drive shafts, particularly illustrating the driving means associated therewith.
Figure 5:
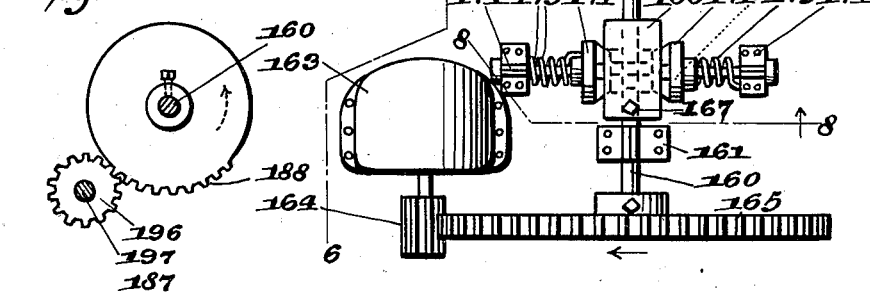
Figure 5 is an elevation of the second quarter gear shown in Fig. 3, the main drive shaft being shown in section.
Figure 4:
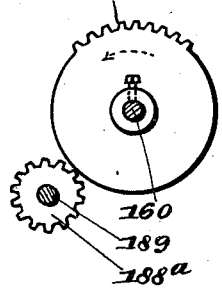
Figure 4 is an elevation of one of the quarter gears shown in Fig. 3, the main drive shaft being shown in section.

The cam gear 178 and the quarter gears 187, 188, are in the correct relative angular positions in Figs. 3, 4 and 5. For the purpose of actuating the reversing devices the gear 187 periodically meshes with a pinion 188a on a short shaft 189 (Fig. 3). A bevel gear 190 on this shaft drives a bevel pinion 191 on one end of a shaft 192. A bevel gear 193 on the other end of this shaft drives a bevel pinion 194 on the countershaft 153 (Fig. 22).

Said countershaft is supported by bearings 195 (Fig. 3) and it carries as many drive pinions 152 (Fig. 22) as there are reversing devices 31, 32, etc. (Fig. 1) to operate. All of said devices are operated simultaneously inasmuch as the countershaft 153 is common to all.

For the purpose of actuating the signboard units 9, 10, etc. (Fig. 1) the quarter gear 188 (Fig. 3) periodically meshes with a pinion 196 on a short shaft 197. A bevel gear 198 on this shaft drives a bevel pinion 199 on one end of a shaft 200. A bevel gear 201 on the other end of this shaft drives a bevel gear 202 on one end of a sub-shaft 203. A bevel gear 204 on the other end of this shaft drives a bevel pinion 205 on the lower end of a connector shaft 206 (Fig. 46).

The latter shaft is the common connector of a pair of endless chain driving shafts 207, 208 (Figs. 2 and 46). For this purpose the connector shaft 206 carries bevel gears 209, 210, in mesh with pinions 211, 212 on the adjacent ends of said shafts 207, 208. The latter carry as many worm pinions 213, 214 as there are signboard units 9, 10, etc. (Fig. 1) as illustrated in the instance of the top driving shaft 208. The respective pinions 213, 214 mesh with worm gears 215, 216 on the adjacent upright sprocket shafts which in this instance are the shaft 36 (Fig. 2) and all of its equivalents in the successive signboard units.

This upright shaft and said equivalents, it will be remembered, carries the pair of sprockets 39, 40 (Fig. 2) and when driving is accomplished by the shafting described, the upper and lower chain belts 41, 42 partake of a step motion, the duration of which is determined by the extent of the quarter gear 188.

A pair of large bevel drive gears 217, 218 (Figs. 3 and 6) is fixedly carried by the main drive shaft 160 in sufficiently spaced relationship to insure their neutralization with respect to driven pinions 219, 220, when the roller 177 (Fig. 6) rides the neutral cams 179, 181. The gears 217, 218 are hereinafter known as the forward and reverse gears. Their respective functions are first to drive the carrier chains 95, 96 and 158, 159 in oppositely outward directions (arrows f, g, Fig. 2); secondly to drive the same carrier chains oppositely and inwardly (arrows h and I, Fig. 2).

The motions for these functions is derived from the drive gears 217, 218 (Fig. 3) through intermediate shafts 221, 222, the inner ends of which carry the pinions 219, 220. The outer ends of these shafts carry pinions 223, 224, in mesh with gears 225, 226 on the lower ends of connector shafts 227, 228 (Fig. 1). The respective ones of these shafts carry pairs of bevel gears 229, 230, 231, 232 (Fig. 46). The gears 229, 230 mesh with pinions 233, 234 on the upper and lower carrier chain shafts 99, 117 (Figs. 37 and 38). It is by this means that the rearward carriers 26, etc. are driven.

The forward carriers 21 are driven in the same way. The upper and lower shafts 99a, 117a of the latter have bevel pinions 235, 236 (Fig. 46) driven by the previously mentioned bevel gears 231, 232 on the connector shaft 228.

With respect to Figs. 3 and 6 it can readily be understood that as long as the main drive shaft 160 stands in the neutral position shown, the drive gears 217, 218 remain clear of the pinions 219, 220 and that the rearward and forward carriers remain stationary as the consequence. The rotation of the cam gear 178 (Fig. 7) is about to drop the roller 177 from the neutral cam 179 onto the forward cam 180. The resulting swing of the shifter 172 (arrow e, Fig. 6) will move the drive gear 217 into mesh with the pinions 219, 220. The rearward and forward carriers are then set in motion.

It was previously indicated that the advertising device is intended for night use as well as day use. For the latter purpose it is necessary to provide for the illumination of the signboards 8 (Fig. 27) when in the display position. The electrical switching arrangement is capable of being located virtually anywhere in the apparatus in Fig. 1, provided that the circuit is closed when the signboards are in the ultimate display position and opened when they are withdrawn from that position. Said arrangement in many instances will control a system of lamps producing a white light. But this is not necessarily adhered to because the switching arrangement is readily enlarged to control auxiliary colored lights.

The signboard unit 13 is herein chosen for the location of the switching arrangement, and the latter is adapted to be situated either above or below, that is to say, the switching arrangement is operable in a position either at the top of the signboards as shown (Fig. 28) or below the signboards. In Fig. 28 a switch 237 pivoted at 238 and adapted to engage a contact 239 which is mounted on an insulating plate 240 (Fig. 29) which is spaced at 241 from the housing front 5. This switch controls an electrical circuit 242 which may be made to embrace as many lamps 243 as desired.

The lamps are mounted on a bracket 244 which surrounds the opening 6 and is spaced outwardly thereof as plainly shown in Fig. 2. It will be understood that the so-called bracket 244 actually comprises an outstanding flange to which the lamp sockets are screwed, the lighting of the lamps furnishing adequate illumination for the signboards when in the display position (dotted lines at right, Fig. 2).

The switch 237 has a finger 245 with which a pair of members 246, 247 cooperate (Fig. 29). These members are attached to the top edge of a signboard. Said members will occur adjacent to each longitudinal edge of a signboard and are respectively adapted to register with the finger 245 when a signboard is turned around. Each of the signboards of the signboard unit 13, has these duplicate members 246, 247.

The member 246 is spring held in the erect position. A spring 248 (Fig. 28) is so combined with the pivot 249 of the said member as to tend to keep it in said erect position. Said member is tiltable inwardly so as to press the finger 245 in the event that the tip of the latter should have gravitated below the travel line 250 of said member. The purpose of this provision is to insure the sequestering of the finger 245 between the members 246, 247.

It is the latter which is adapted to engage the finger 245 when in the dotted line position (Fig. 29), and to move the switch to the closed position as the signboard approaches the opening 6. The member 246 remains rigid on the return stroke of the signboard and carries the switch 237 with it until the latter reassumes its open position. The member 246 then passes thereunder in the manner suggested in Fig. 29.

The invention embraces a number of features not previously brought out and these are now described in the order in which they would have occurred. Each one of the main shafts is subdivided into a plurality of short shafts for the purpose of facilitating repairs in the event that such become necessary. The drive shaft 208 (Fig. 1) is cited as an example. Reference is made to Fig. 30 wherein this shaft is shown to be divided into relatively short sections. Each of the sections has a half coupling 253 secured to it. The flanges of these couplings are secured by removable fasteners 254. It is readily seen that if any of the worm pinions on this shaft should become damaged, it will be perfectly easy to take out that section which carries the damaged pinion and to substitute another section with a new pinion. If the entire shaft had to be removed a great amount of time would be lost.

A further detail comprises the bearings for all important upright shafts. The shaft 36 (Fig. 13) is taken as an example. The upper end of this shaft has a member 255 (Fig. 40) secured to it in any suitable way. This member coacts with a companion member 256, the two members constituting a race for the ball bearings 257. The member 256 is seated in a recess 258 in an adjoining part of the housing in which it is secured by bolts 259. An oiler 260 is so connected with a duct in the member 256 as to keep the bearing lubricated constantly. A bearing of this description is duplicated at the bottom of the shaft 36 and it is obvious that the nature of these bearings is such as to support the sprocket shafts 37, 38 with a minimum of friction.

Attention is next directed to Figs. 11, 12 and 12a which illustrate a brake arrangement, generally designated 261, adapted to be used on four of the horizontal shafts 203, 153, 221, 222, (Fig. 3). The purpose of this brake arrangement is to steady these and others of the shafts at the end of an operation so that any unforseen vibration will not cause the shaft 153 and others to drift farther than intended or desired. To this end the brake arrangement is only required to apply a fairly firm frictional hold upon the respective shaft, and not to lock said shaft against turning at the start of an operation.

The brake arrangement for the counter-shaft 153 is described in detail, and this description applies to the other brake arrangements wherever used. A cam 262 (Fig. 12) is fixedly carried by the shaft 153. This cam comprises a circular portion 263 which merges into the cam lobe 264 (Fig. 12a).

A roller 265 (Fig. 11) rides the surface of the cam. This roller is carried by a spindle 266 which projects from one side of a brake plate 267. This plate has a complemental plate 268, each of the two plates being movably situated at the respective sides of a rigid brake base 269. Said base fixedly carries a number of studs 270 which project sufficiently far beyond the sides of the base to go through slots 271 (Fig. 12a) and 272 (Fig. 12) where they are headed at 273 to retain the brake plates in working relationship to the base.

Straps 274 (Fig. 12) or their equivalents, provide pivotal supports at 275 for a pair of levers 276 which are centrally jointed at 277. At their remote and free ends these levers bear upon the pads 278 of lifters 279 which extend through openings 280, 281 respectively in the base 269, and brake plate 268 from their places of connection to the brake plate 267 of which they are rigid parts.

The straps 274 are fixtures on the base 269. They extend through openings 282 in the brake plate 268. Said openings are long enough to compensate for the downward movement of the plate 268 when the lifters are moved upwardly with the plate 267. The downward movement of the plate 268 is produced by anchoring the pin 277, which is part of the foregoing joint, to the plate 268.

The respective plates 267, 268 have segmental brake linings 283, 284. These are suitably secured in the arched ends of openings 285, 286 in the brake plates. These openings are occupied by a brake drum 287 on the shaft 153. It is readily seen that a raising movement of the cam lobe 264 against the roller 265 will raise the brake plate 267.

That action depresses the brake plate 268 by means of the lifters 279 and jointed levers 276, the pivot 277 of the latter being secured on the plate 268. The brake linings 283, 284 are in opposing positions in respect to the drum 287, and by virtue of the brake plate actions are brought into contact with the drum. However, the arrangement of the parts is such that only a light frictional hold is applied to the brake drum.

This is sufficient to prevent coasting of the shaft 153 which, at this stage in the operation, is supposed to have come to a stop. Said hold will not prevent the release of the brake when the apparatus is started again, the initial turning of the shaft 153 readily being possible to advance the cam lobe 264 past the roller 265. The brake plates 267, 268 are then returned to their former and released position by any known means, for example, the predominating weight of the plate 267, or a spring anchored to the base and appropriately attached to one of the plates.

*The operation* is readily understood. Attention is again directed to Fig. 1 respecting which it is to be assumed that the signboards in the panel formations 14, 15 have just assumed those formations thereby to represent the end of a simultaneous step motion of each of the units 9—13.

At this moment the forward cam 180 (Fig. 7) is about to receive the roller 177 when the latter drops from the neutral cam 179. The resulting shifting of the constantly revolving main drive shaft 160 (arrow j, Fig. 6) engages the gear 217 with the pinions 219, 220. The shafts 221, 227, 99 and 117 are operated on the one hand, while the shafts 222, 228, 99a and 117a are operated on the other hand. The various carrier chains are moved oppositely outwardly (arrows f and g, Fig. 2). The sign panels 15, 14 (Fig. 1) are moved rearwardly and forwardly in unison. For this purpose said panels are picked up by the tooth-edge sockets 93, 93a and 94, 94a according to the manner explained in detail with respect to the sockets 93, 94 in Figs. 37 and 38.

Said sign panels travel rearwardly and forwardly to the dotted line positions (Fig. 2). The signboards in the panel formation 15 are about to be turned around 180°. The signboard panel 14 is in the display position (Fig. 27).

Figure 22 illustrates the signboards in position for reversal or turning around; as soon as the forward cam 180 (Fig. 7) has passed under the roller 177, the latter rises onto the next neutral cam 181. The quarter gear 187 (Fig. 4) then reaches the pinion 188a; the neutralization of the gear 217 (Fig. 3) renders the upper and lower sets of carrier chains inactive. The turning of the pinion 188a causes turning of the shafts 192, 153 (Fig. 3), the latter being the countershaft which actuates all of the reversing devices 31, 35 in unison. A 180° turn of the signboards is accomplished by the quarter section of the gear 187.

The utilization of that quarter section occurs for the extent of the neutral cam 181 (Fig. 7). The reverse cam 182 now rides under the roller 177 and shifts the main drive shaft 160 (arrow k, Fig. 6) to engage the reverse gear 218 with the pinions 219, 220 (Fig. 3). The earlier directions of motions of the shafts 221, 222, and all others that derive power therefrom are now reversed. The various chain carriers are again moved toward the inside of the housing 1. The rear chain carriers move in the directions of the arrow h while the front chain carriers move inwardly in the direction of the arrows i (Fig. 2). Reengagement of the twin hooks 68 and 69 of the signboards is made with the twin sockets 70, 71 at the ends of the signboard units 9, 13 and by this time the reverse cam 182 will have passed from under the roller 177, raising the latter to the level of the neutral cam 179 (Fig. 7) and restoring the gear 218 to its neutral position.

Also by this time the quarter gear 188 will have reached the pinion 196 (Fig. 5). The turning of the latter for the ensuing quarter imparts motion to the chain belts 41, 42 in the units 9, 13. All of the signboards are advanced one step. Some of the signboards will assume new panel formations 14, 15 in readiness for a repetition of the foregoing operation. The electrical system in Figs. 28 and 29 is worked intermittently so as to furnish illumination each time a newly arrived sign panel is advanced to the front 5 behind the sign opening 6.

The brake 261 of the shaft 153, which shaft is representative of any other shaft that makes a full revolution in each sign changing operation, automatically comes into play at the end and beginning of each such operation. The brake plates 267, 268 are made to work reversely by the cam 262 (Fig. 12a) at said end and beginning, first to apply a light pressure to the brake drum 287 (Fig. 12), second to release it. The apparatus is thus given a desired steadying influence which insures a rhythmic working thereof.

I claim:

1. Advertising apparatus comprising a housing having a back and a front with an opening, a plurality of signboard units in the housing, each unit including belt means, signboards having fractional signs on opposite sides, and means for detachably mounting the signboards on the belt means, means for operating the belt means with a step by step motion to periodically assemble successive signboards in panel formation and in positions confronting said back and front, carrier means included in said units and situated contiguously to said front, other carrier means included in said units and located contiguously to said back, means to operate all of the carrier means simultaneously to convey the panel formations respectively toward the front into a sign-display position behind said opening and toward said back, interengageable means on the various carrier means and on the signboards for detaching said signboards from the belt means, and reversing devices between said other carriers and the back for receiving the signboards from said carriers and turning said signboards around preparatory to redelivery to said other carriers.

2. Advertising apparatus comprising a signboard unit including a plurality of sign boards and belt means to which the signboards are detachably mounted in spaced relationship to each other, means for operating the belt means with a step by step motion so as to advance successive signboards into a preliminary display position, carrier means extending from said preliminary display position to a display position, interengageable means carried by each sign board and said carrier means, and means for operating said carrier means forwardly causing a coupling of said interengageable means and the detachment of the respective signboard from the belt means for advancement to the display position.

3. Advertising apparatus comprising a signboard unit including a plurality of signboards and belt means to which the signboards are detachably mounted in spaced relationship to each other, means for operating the belt means with a step by step motion so as to advance successive signboards into a preliminary display position, carrier means extending from said preliminary display position to a display position, interengageable means carried by each sign board and said carrier means, means for operating said carrier means forwardly causing a coupling of said interengageable means and the detachment of the respective signboard from the belt means for advancement to the display position, and means for operating said carrier means reversely to restore said signboard to its mounting on the belt means.

4. Advertising apparatus comprising a signboard unit including a plurality of sign boards, each having indicia on opposite sides, belt means and means by which the signboards are detachably mounted on the belt means, a reversing device for turning the signboards around, thereby to reverse the positions of the indicia, a carrier between the device and the belt means, interengageable means on the carrier and each of the signboards, mans for operating the belt means wit ha step by step motion so as to bring successive signboards into registration with the carrier for the coupling of said interengageable means, means then to operate the carrier causing said coupling and the detachment of the respective signboard from the belt means, and means embodied in the reversing device receiving the signboard from said carrier preparatory to said turning around.

5. Advertising apparatus comprising a signboard unit including a plurality of signboards, a pair of belt means, means by which the signboards are detachably mounted on the belt means, means for operating the belt means with a step by step motion so as to advance the successive boards to a predetermined stop position, a pair of carriers beginning at and extending away from the stop position, interengageable means mutually carried by each end of each signboard and by each carrier, said means including anchor hooks on the signboards and anchor pins on the carriers, and means for simultaneously moving the carriers, thereby to interengage the anchor pins and hooks, detach the signboard from the belt means at said stop position and convey said signboard along the carriers.

6. Advertising apparatus comprising a pair of carriers, means for alternately driving the carriers forwardly and backwardly, a signboard unit coacting with said carriers including a plurality of signboards, belt means, and means by which the signboards are detachably mounted on the belt means, interengageable means mutually carried by the signboards and by the carriers, the signboards being adapted to be coupled to the carriers for transportation forwardly and backwardly therealong during temporary detachment from the belt means, and means to operate the belt means with a step by step motion to advance successive signboards to a position of detachment thereof from the belt means by the carriers.

7. Advertising apparatus comprising a pair of chain belts, a signboard spanning the distance between said belts, hook and socket means respectively associated with the signboard and chain belts providing a detachable mounting for the signboard on said belts, carriers beginning at and extending from a stop position of the signboard at which it is temporarily stationed, interengageable means mutually mounted on the carriers and the adjacent ends of the signboard, and means for setting the carriers in motion, thereby coupling the interengageable means to lift the signboard for temporary detachment at said hook and socket means while advancing the signboard along said carriers.

8. Advertising apparatus comprising chain belts, a plate connected to and spanning the distance between said chain belts, a signboard adjacent to said plate, said signboard having hooks, socket means carried by the plate and occupied by the hooks to provide a detachable mounting for the signboard, carriers beginning at and extending from a stop position of the signboard, interengageable means comprising anchor pins on the carriers and anchor hooks on the signboard, and means for moving the carriers to couple the anchor pins with the anchor hooks thereby to lift the signboard and thus disconnect the hook and socket means and convey the signboard along the carriers and away from the plate.

9. Advertising apparatus comprising a pair of chain belts, a plate attached to the chain belts and spanning the distance therebetween, upwardly directed socket means mounted on said plate, a signboard adjacent to the plate and having hooks occupying the socket means for detachably mounting the signboard upon the plate, movable carriers beginning at and extending from a stop position of the signboard, and interengageable means mutually mounted on the carriers and the ends of the signboard, adapted to be coupled to lift the signboard and thus uncouple the hook and socket means.

10. In advertising apparatus, a signboard, means for conveying said signboard to a stop position, carriers for picking the signboard up at said position and transporting it a predetermined distance, and means for accomplishing the picking up, said means comprising interengageable anchor pins and hooks respectively on the carriers and the ends of the signboard, a tooth-edge connection supplementing the anchor hooks on the ends of the signboard, and tooth-edge sockets supplementing the anchor pins on the carriers, the sockets and tooth-edges interfitting to stabilize the signboard on the carriers.

11. In advertising apparatus, a signboard adapted to be transported to a stop position, movable carriers beginning at and extending from said position, each including pin-connected link chains, and means mutually mounted on the carriers and the adjacent ends of the signboard, adapted to be coupled and thereby move the signboard from said position, said means comprising articulated socket members radiating from a group of pins of each carrier chain, certain ones of said socket members having anchor pins, and connections on the ends of the signboard having a series of teeth to interfit the sockets and having anchors to interengage the anchor pins.

12. In advertising apparatus, a signboard adapted to occupy an erect stop position, carriers beginning at and extending from said stop position, each carrier including a movable chain flight adjacent to the respective end of the signboard, means mutually mounted on the carrier chains and said ends of the signboard adapted to be coupled upon movement of the carrier chains thereby to transport the signboard from said stop position, rollers extending from the carrier chains, and tracks fixed along said adjacent chain flights, said tracks being ridden by the rollers during transportation of the signboard to prevent sagging of said flights.

13. In advertising apparatus, a signboard, a pair of carriers for transporting the signboard to one end of the carriers, a pair of blocks adjacent to said end of the carriers being adapted to receive the ends of the signboard, means providing a turnable mounting for both blocks, and means for turning one of the blocks, thereby to turn the signboard and change its position in reference to the carriers prior to being again picked up thereby.

14. In advertising apparatus, a signboard reversing device comprising a slotted block to receive one end of a signboard, means to turn said block so as to change the angular position of the signboard, gripping pins slidably carried by said block and adapted to engage the adjacent end of the signboard, and means for periodically abstracting the gripping pins to permit unobstructed emplacement and displacement of the signboard from said slotted block.

15. In advertising apparatus, a reversing device for a signboard comprising a slotted block to receive one end of a signboard, means to turn said block and consequently the signboard to change its angular position, a pair of gripping pins slidably carried by the block, said pins having springs to project the ends of the pins into engagement with the signboard, thereby to interlock the latter with the block, a bridge connecting said pins, an arm carried by the bridge and a relatively stationary cam with which the arm is engageable during said turning, thereby to abstract the ends of the pins from the signboard in a position of emplacement and displacement of the latter into and from the slot.

16. In advertising apparatus, a signboard unit including chain belts and detachably carried signboards, means for imparting a periodic step by step motion to the chain belts to periodically transport the signboards to stop positions at the ends of said unit, pairs of carriers beginning at said stop positions and extending forwardly and rearwardly from said ends of the unit, interengageable means mutually mounted on the carriers and on the ends of the signboards adapted for engagement with the signboards in the stop positions between the periods of step by step motion of said chain belts and means for then simultaneously moving the carriers in opposite directions from and toward the ends of the unit, thereby to transport the end signboards away from from and back to said stop positions.

17. In advertising apparatus, pairs of oppositely directed carriers for transporting signboards away from and back to stop positions, means for actuating the carriers to produce said transportations, said means including a main drive shaft, means for constantly rotating said drive shaft in one direction, a pair of drive gears affixed to said shaft in spaced and confronting positions, a system of shafting in driving connection with the carriers terminating in pinions in positions for being meshed with the drive gears, and means automatically actuated by the rotation of the drive shaft for axially shifting said shaft to successively engage the drive gears with the pinions, thereby to actuate the carriers in alternately opposite directions.

18. In advertising apparatus, a signboard unit including chain belts and signboards detachably mounted thereon, carrier means for transporting selected signboards in opposite directions from and toward the chain belts, mutually interconnectible means mutually on the signboards and carrier means, means to actuate said unit with a step by step motion consisting of drive shafting for said unit and a quarter gear to periodically drive said shafting thereby to advance said selected signboards to positions at the entrances to the carrier means and then to stop, and sequentially operable drive gears for the carrier means to transport the signboards in the aforesaid directions before the next step motion is imparted to said unit.

19. In advertising apparatus, a circulatory series of signboards arranged for advance with a step by step motion, a reversing device stationed at a chosen place along the series but spaced from said base, said device including top and bottom sockets in which the ends of the signboard are adapted to be temporarily caught, carrier means located in said space, successively removing a signboard from the series, transporting it to the sockets of the reversing device and then restoring said signboard to its place in the series, and gearing directly coupled with one of the sockets, including a mutilated gear periodically actuating the reversing device.

20. Advertising apparatus comprising a housing having a front with an opening, a signboard initially situated in a standing position at a distance from and confronting said opening and having a sign indicia thereupon, movable carrier means from which said sign board is detached when initially situated as aforesaid, said carrier means spanning the distance between the standing signboard and said opening, means embodied in said carrier means to pick up and transport the signboard through said distance to a display position behind said opening, and then release the sign board, and electrical lighting means then rendered operative by the signboard to illuminate the indicia.

21. In advertising apparatus, a shaft adapted to make a turn periodically in the operation of said apparatus, a brake arrangement correlated with said shaft consisting of a drum and a cam secured thereto, a pair of brake plates having linings adapted to engage the drum, a base on which said plates are loosely mounted, means on one of the plates riding the cam, and means interconnecting the plates, causing the other plate of said pair of brake plates to move reversely to said one plate when actuated by the cam at the end of said turn of the shaft, thereby to apply a light brake tension to said drum.

22. In advertising apparatus, a movable signboard, a reversing device toward which said signboard is gradually advanced with a step by step motion, a pair of confronting turnable blocks in said device between which said signboard is adapted to be positioned, rollers journaled in said blocks and tracks on the ends of the signboard adapted to glide on the rollers, and means temporarily interlocking the blocks and signboard, preventing motion thereof on said rollers during a subsequent turning effort applied to one of the blocks.

JOHN L. PFLÜEGER.